Nov. 13, 1923.                                            1,473,644
                    H. RODRIGO, SR
                      WELL SCREEN
                   Filed Aug. 5, 1921

Henry Rodrigo, Sr. INVENTOR.
BY Hardway & Cather ATTORNEYS.

Patented Nov. 13, 1923.

1,473,644

UNITED STATES PATENT OFFICE.

HENRY RODRIGO, SR., OF HOUSTON, TEXAS.

WELL SCREEN.

Application filed August 5, 1921. Serial No. 490,116.

*To all whom it may concern:*

Be it known that I, HENRY RODRIGO, Sr., a citizen of the United States, residing at Houston, in the county of Harris and State of Texas, have invented certain new and useful Improvements in a Well Screen, of which the following is a specification.

This invention relates to new and useful improvements in a well screen.

One object of the invention is to provide a well screen specially adapted for use in oil wells and which will effectually arrest, and screen off, the sand but permit the free inflow of oil from the surrounding reservoir.

Another object is to provide a screen formed of two concentric perforated pipes spaced apart and containing between them gravel or aggregate, and an inner screen pipe arranged concentrically within said perforated pipes, said screen pipe being removable to permit its cleansing or replacement with a new one.

With the above and other objects in view, this invention has particular relation to certain novel features of construction, arrangement of parts and use, an example of which is given in this specification and illustrated in the accompanying drawings, wherein:—

Figures 1, 2:
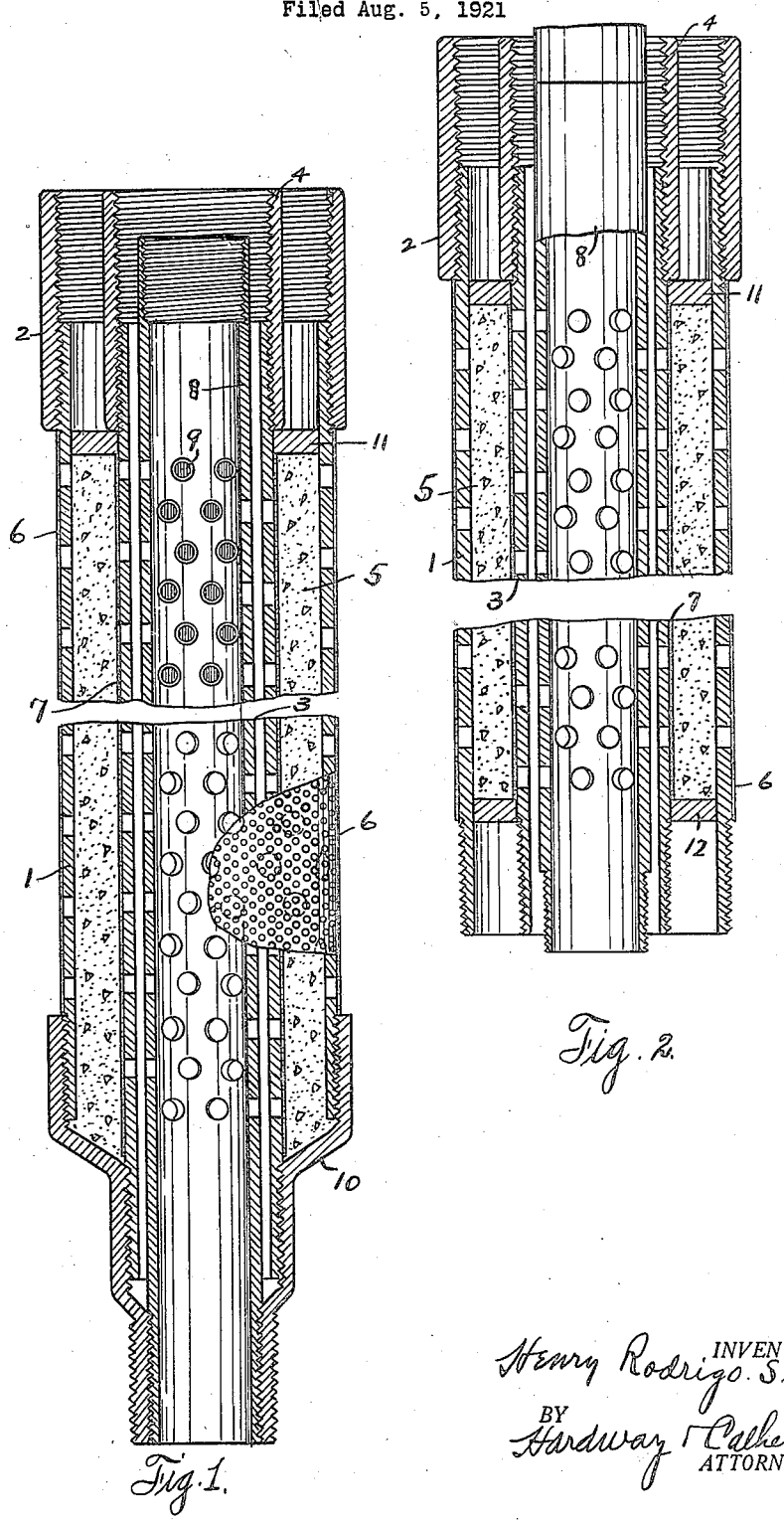
Figure 1 shows a vertical sectional view of the lower joint of the screen.
Figure 2 shows a vertical sectional view of the adjacent upper joint.

Referring now more particularly to the drawings the numeral 1 designates an outer perforated pipe whose joints are connected by collars, as 2. The numeral 3 designates an inner perforated pipe whose joints are connected by the collars 4. These perforated pipes are concentric and spaced apart. The space between them is filled with aggregate 5, preferably gravel. These pipes are surrounded by thin metallic sheaths 6 and 7, respectively, having small perforations to prevent the aggregate from falling through the larger perforations of the pipes 1 and 3.

Arranged concentrically within, and spaced from, the inner pipe 3 there is a screen pipe 8, whose joints are connected together as shown. This screen pipe is perforated and the perforations thereof are protected against the inflow of sand by means of slitted buttons 9 or other suitable screening means.

The pipes 1 and 3 and the screen pipe 8 are anchored together at the bottom by means of a swedge nipple 10 into which they are screwed, as shown in Figure 1.

When the screen is set in a well the oil will flow in through the perforated pipes and the sand and detritus will, in a large measure, be arrested by the aggregate 5. The sand that succeeds in passing through the aggregate will be arrested by the screening buttons 9. Should the screen pipe become clogged up it may be readily unscrewed and removed and cleaned or replaced without disturbing the outer pipes or the aggregate between them.

This aggregate 5 is firmly held in place by means of annular washers 11 and 12 arranged between said pipes 1 and 3 at their respective ends and in turn held in place by the couplings 4 which abut against them.

What I claim is:—

1. A well screen including two concentric perforated pipes, aggregate between said pipes, and a removable tubular screen within the inner pipe, and spaced therefrom.

2. A well screen including an outer and an inner perforated pipe spaced apart, aggregate between said pipes, a removable tubular screen within the inner pipe.

3. A well screen including an outer and an inner perforated pipe spaced apart, aggregate between said pipes, a tubular screen within the inner pipe and spaced therefrom, and means for securing said pipes and screen together, said screen being detachable from said means.

4. A well screen including an outer perforated pipe, an inner perforated pipe spaced within said outer pipe, aggregate filling the space between said pipes, a removable tubular screen within the inner pipe, and a common anchor to which the lower ends of the pipes and screen are attached.

In testimony whereof I have signed my name to this specification in the presence of two subscribing witnesses.

HENRY RODRIGO, SR.

Witnesses:
E. V. HARDWAY,
W. R. DUNLAY.